Figure 1:
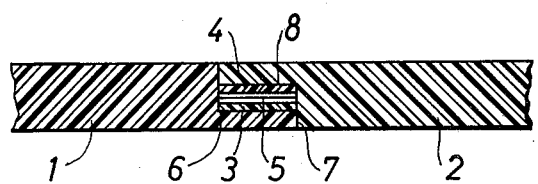

Oct. 29, 1963     H. THEILEMANN     3,108,925

FILM SPLICE TAPE

Filed Sept. 27, 1960

INVENTOR.
HORST THEILEMANN
BY
his ATTORNEYS

United States Patent Office 3,108,925
Patented Oct. 29, 1963

3,108,925
FILM SPLICE TAPE
Horst A. Theilemann, Munich, Germany
Filed Sept. 27, 1960, Ser. No. 58,819
Claims priority, application Germany Sept. 30, 1959
1 Claim. (Cl. 161—231)

The present invention relates to the splicing of films and more especially to the splicing of films such as processed photographic cinematographic films having film bases which cannot or can only be united with difficulty by film cement.

The normal cinematographic film ribbons having film bases of cellulose esters could easily be stuck together or attached to one another, even where it was a question of inflammable or difficultly inflammable films, because they can be united to or on one another by the normal commercial film cement. The joints, for example between a newsreel and an advertising film, were produced by first of all removing the emulsion layer on one of the ends of one film ribbon, roughening the cellulose ester base as far as possible, then coating one of the two sides of the film with film cement and joining the two ends of the ribbons to one another with an overlap in a splicing press.

In addition to the films with the aforementioned compositions, there are also available today films having film bases of synthetic resins, for example polycarbonate, which cannot be united with the prior known films in the manner indicated above, although they can be united to one another. It is possible to join these films to cellulose ester films by means of known transparent adhesive foils, by sticking the said foils as connected pieces on one or both sides of abutting ends of said films. However, this process has the disadvantage that the rubber-like, non-hardening adhesive usually protrudes at the sides and retains dust particles, quite apart from the fact that the layers reeled one upon the other stick together.

The invention has for its object to obviate the disadvantages set forth above. In order to achieve this object, it is proposed that one end of one of two ribbons of film which are to be united and the end of the other film ribbon are stuck to opposite surfaces of a multi-layer film strip of comparatively small length but having the same width and if desired the same perforations as the film ribbons, the multi-layer film strip comprising one outer layer of a film-forming material which is the same as the film-forming material of the base of one film ribbon and one other outer layer of a film-forming material which is the same as the film-forming material of the base of the other of the film ribbons to be connected, the said outer layers being united by means of at least one dry adhesive layer. This adhesive layer may be produced from a copolymer of vinyl chloride and vinyl isobutyl ether, of rubber cement or the like. According to one embodiment of the invention the splicing may be carried out by sticking the multi-layer film strip to the end of one film ribbon in known manner after the image-carrying emulsion layer has been removed preferably over the length of the imperforate portion between two longitudinal perforations. The multi-layer film strip is then shortened to the size of said imperforate portion and the end of the other film ribbon is stuck to the other side of the multi-layer film strip in the same manner over this width, so that both ends of the ribbon overlap one another with interposition of a section of said multi-layer film. According to another embodiment of the invention the splicing may also be carried out in such a way that the multi-layer film strip is stuck in known manner to one end of one film ribbon over the length of said imperforate portion and then the end of the other film ribbon is so stuck to the other side of the multi-layer film strip that a spacing exists between the indirectly united ends of the film ribbons.

The production of a multi-layer film strip, the thickness of which is chosen to be different, according to how parts thereof are stuck to the ends of film ribbons which are to be united, may for example be effected in such a way that one layer thereof, consisting for example of polycarbonate, has cast thereon one or more layers of an adhesive, for example of a copolymer of vinyl chloride and vinyl isobutyl ether, and then the other layer is applied to the said intermediate layer or layers, the said other layer essentially consisting of the film-forming material of the base of the second film ribbon.

The invention also covers the multi-layer film strip of the composition as set forth above.

The invention is illustrated by reference to the drawings, which diagrammatically show spliced joints between two film ribbons which formerly could not be stuck together.

Figure 2:
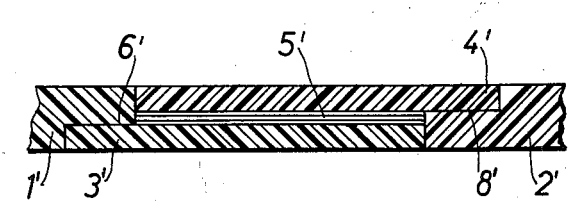

In the drawings:

FIG. 1 is a longitudinal section through a spliced joint between the ends of two overlapping film ribbons, which are indirectly connected together by means of a multi-layer film strip having the width of both films, but only a length corresponding to the longitudinal perforation spacing, FIG. 2 is a longitudinal section through a spliced joint between two film ribbons which formerly could not be connected together, and which are to be so indirectly connected by way of a multi-layer film strip that a space exists between their end edges, these views being on a greatly enlarged scale.

The ends of two film ribbons 1 and 2, or 1' and 2', which cannot be spliced together by using normal commercial film cement, are indirectly united according to FIG. 1 by a film strip having the depth corresponding to a longitudinal perforation spacing, and according to FIG. 2 by means of a film strip which has a length greater than the longitudinal perforation spacing but preferably smaller than the length of one image frame of a cinematographic film.

In the case of the constructional example shown in FIG. 1, the film ribbon 1 consists for example of a film of nitrocellulose and the film ribbon 2 of polycarbonate such as of a normally solid film-forming polyester of carbonic acid and 4.4'-dihydroxyphenyl-propane-(2.2). In this case, the layer 3 of the multi-layer film strip to be united to said two ribbons consists of a film of nitrocellulose, and the layer 4 consists of the recited polycarbonate, the two layers being united by intermediate layers 5 consisting essentially of a copolymer of vinyl chloride and vinyl isobutyl ether or other adhesive layers. The film strip 3, 4, 5, which is for example wound to form a reel, is first of all stuck with normal commercial film cement to the surface 6 of the end of the film ribbon 1. Then the stuck portion is severed from the rolled portion by means of the knife of a known splicing press along the edge 7 and then the surface 8 of the end of the second film ribbon 2 is united to the layer 4, likewise by means of film cement, so that the two ends of the films overlap.

In the case of the constructional examples shown in FIG. 2, the multi-layer film strip has a greater thickness than that used for sticking the ends of the film ribbons and shown in FIG. 1. It is also assumed here that the film ribbon 1' consists of nitro-film and the film ribbon 2' of polycarbonate film. Accordingly, the nitro layer 3' is united to the film ribbon 1' and the polycarbonate layer 4' is united to the film ribbon 2', in each case by means of a layer of film cement, this taking place in the region of the surfaces 6' and 8'. The layers 5' consist of the same copolymer as the layers 5 of the constructional example according to FIG. 1. Since here one film ribbon end and one layer of the multi-layer film strip overlap one another, there are two adhesive or spliced joints for one union of two film ribbons of different types of materials which formerly could not be stuck together.

Example 1

A multi-layer film strip for splicing a cinematographic film having a support of cellulose triacetate with a cinematographic film having a support of polycarbonate (polyester of carbonic acid and 4.4'-dihydroxyphenyl-propane-(2.2) was prepared as follows:

A foil of cellulose triacetate and of the above-mentioned polycarbonate each of a length of 15–20 mm. are united as indicated in FIG. 2 in such a manner that the free ends 6' and 8' have a length of approximately 2–3 mm. This is accomplished by coating the two foils at the areas to be stuck together with a 50 percent solution of a co-polymer of 1 part of vinyl chloride and 1 part of vinyl isobutyl ether in a lower chlorinated hydrocarbon such as trichlorethylene and by pressing together the combined foils. The resulting multi-layer film strip consists of the cellulose ester foil, an intermediate adhesive layer and the polycarbonate foil.

The above-mentioned cinematographic film of cellulose triacetate and polycarbonate are spliced by means of said multi-layer film strip as indicated in FIG. 2. The bared areas of the cellulose ester film 6' is coated with an adhesive consisting of a solution of 5 g. cellulose triacetate in 70 ccm. methylene chloride, 10 ccm. methyl alcohol, 10 ccm. acetone and 10 ccm. methyl glycol acetate and pressed together with the free end of the cellulose triacetate foil of the multi-layer film strip. In a corresponding manner the bared area of the polycarbonate foil is spliced with the free end of the polycarbonate foil of the multi-layer film strip by using an adhesive solution of 5 g. of polycarbonate having essentially the same structure as the polycarbonate of the foil in 50 ccm. methylene chloride, 30 ccm. trichlorethylene, 10 ccm. methyl glycol acetate, 5 ccm. methyl alcohol and 5 ccm. tetrahydrofurane.

Example 2

According to another modification of the invention the multi-layer film strip may be prepared by applying several adhesive layers for splicing the two foils of the multi-layer film strip. A cellulose triacetate foil is coated with a first intermediate layer consisting of a copolymerization of 90 percent of vinylchloride and 10 percent vinylisobutylether. The second adhesive layer, which is coated on to the last-mentioned layer consists of a copolymer of 1 part of vinylchloride and 1 part of vinylisobutylether. The third adhesive layer with which the polycarbonate foil is spliced consists of 10 percent of a copolymerisate of vinylchloride of 90 percent of vinylisobutylether. That multi-layer film strip is used for splicing film of cellulose triacetate and of polycarbonate as disclosed in Example 1.

What is claimed is:

A splicing tape for splicing a photographic cinematographic film having a base consisting of cellulose esters with another cinematographic film having a base consisting of polyesters which comprises (I) a foil consisting of a cellulose ester and (II) a second foil consisting of a polyester, said two foils being stuck together by means of an adhesive consisting of a copolymer of vinyl chloride and vinyl isobutyl ether.

References Cited in the file of this patent

UNITED STATES PATENTS

| | | |
|---|---|---|
| 1,802,985 | Semon | Apr. 28, 1931 |
| 2,042,692 | Wurzburg | June 2, 1936 |
| 2,060,906 | Snyder | Nov. 17, 1936 |
| 2,112,249 | Moss | Mar. 29, 1938 |
| 2,234,621 | Brous | Mar. 11, 1941 |
| 2,467,322 | Lightbown | Apr. 12, 1949 |
| 2,679,969 | Richter | June 1, 1954 |
| 2,961,365 | Sroog | Nov. 22, 1960 |